United States Patent [19]
Rystad

[11] 3,796,405
[45] Mar. 12, 1974

[54] ROLLER BRACKET

[75] Inventor: Arnold O. Rystad, Lakeport, Calif.

[73] Assignee: Work Right Products Inc., Hayward, Calif.

[22] Filed: Oct. 16, 1972

[21] Appl. No.: 297,925

[52] U.S. Cl. .............................. 248/489, 248/316 D
[51] Int. Cl. .................................................. A47g 1/16
[58] Field of Search ......... 248/316 R, 316 B, 316 D, 248/467, 468, 475 R, 489; 40/125 A, 125 F, 125 M; 211/45; 24/243 B, 243 CC, 255 R

[56] References Cited
UNITED STATES PATENTS

| | | | |
|---|---|---|---|
| 3,350,045 | 10/1967 | Mayers | 248/467 X |
| 2,144,140 | 1/1939 | Batcheller | 24/248 SA |
| 1,025,058 | 4/1912 | Hampson | 24/243 B |
| 2,190,463 | 2/1940 | Watt | 24/243 B |

FOREIGN PATENTS OR APPLICATIONS

| | | | |
|---|---|---|---|
| 92,080 | 9/1959 | Netherlands | 211/45 |
| 399,623 | 7/1909 | France | 24/243 B |

Primary Examiner—William H. Schultz
Attorney, Agent, or Firm—Bruce & McCoy

[57] ABSTRACT

A bracket for suspending a sliding glass door comprising a unitary body defining a panel-receiving channel in which facing side walls of the channel are serrated to securely engage a glass panel inserted therebetween. Portions of the channel walls above the serrated facing side portions define an opening formed in the shape of a right triangle, whereby, the side wall portions of the channel may be deflected toward each other by the tightening of screws passing through the channel side walls to securely engage said glass panel therebetween. Roller means are also provided for slidably mounting the door.

3 Claims, 3 Drawing Figures

PATENTED MAR 12 1974  3,796,405

ROLLER BRACKET

BACKGROUND OF THE INVENTION

1. Field of the Invention

This application relates generally to a panel mounting bracket and, more particularly, to a sliding door suspension bracket especially adapted for clamping directly to a sliding glass shower door panel.

2. Description of the Prior Art

Many types of mounting roller brackets are now used and available for the mounting of glass panels to form sliding or swinging shower doors. One type of roller panel mounting bracket is disclosed in U. S. Pat. No. 3,481,572, issued Dec. 2, 1969, to Casebolt et al. The bracket of this patent includes a channel section into which a bearing element, formed integrally with and separable from the channel is inserted. With the bearing element inserted into the channel, screws are provided to force the bearing element against one surface of the panel inserted into the channel. In this manner, the bracket is coupled to the panel. However, these panel mounting brackets require the use of separate bearing elements to allow the panel to be held in the channel. These separate bearing members are forced into contact with the panel by means which in some situations do not properly coact the bearing element and, therefore, do not always retain the panel element in proper position particularly under adverse conditions.

A need therefore exists for a glass panel mounting roller bracket for use with sliding glass shower doors which positively and firmly locks the panel element in position and which is of a simplified and more easily fabricated design to facilitate mounting and reliability in use.

SUMMARY OF THE INVENTION

The present invention comprises a roller bracket having a unitary body including deflectable parallel spaced sidewall portions depending from a transverse section element and defining a glass panel receiving channel therebetween. The facing sidewalls proximate the open bottom of the channel are serrated to securely engage the panel in a direct contact relation. Means are provided for forcibly urging the serrated sidewalls into intimate contact with a glass panel disposed in the channel for positively coupling the roller bracket on the panel. Roller means are provided on the unitary body adapted to engage a frame/track surface to permit slidable suspension of the glass panel as in the door of a shower stall.

OBJECTS OF THE INVENTION

It is therefore an important object of the invention to provide a roller bracket which may be directly coupled or clamped to a glass panel such as those used in sliding glass doors.

It is another object of the present invention to provide roller brackets for suspending a glass panel from a top edge thereof, which brackets include deflectable channel sidewall portions to enable them to be securely clamped to the panel.

It is a further object of the instant invention to provide a panel roller bracket including a unitary body formed by extrusion at a minimum cost and in a minimum of time.

Still another object of the invention is to provide a panel mounting roller bracket including a channel sidewall which is pivotally deflectable for positively clamping the bracket to the top edge of a glass panel.

DESCRIPTION OF THE INVENTION

Additional objects of the invention will be brought out in the following description of the preferred embodiment of the roller bracket, taken into conjunction with the accompanying drawings, wherein.

Figure 1:
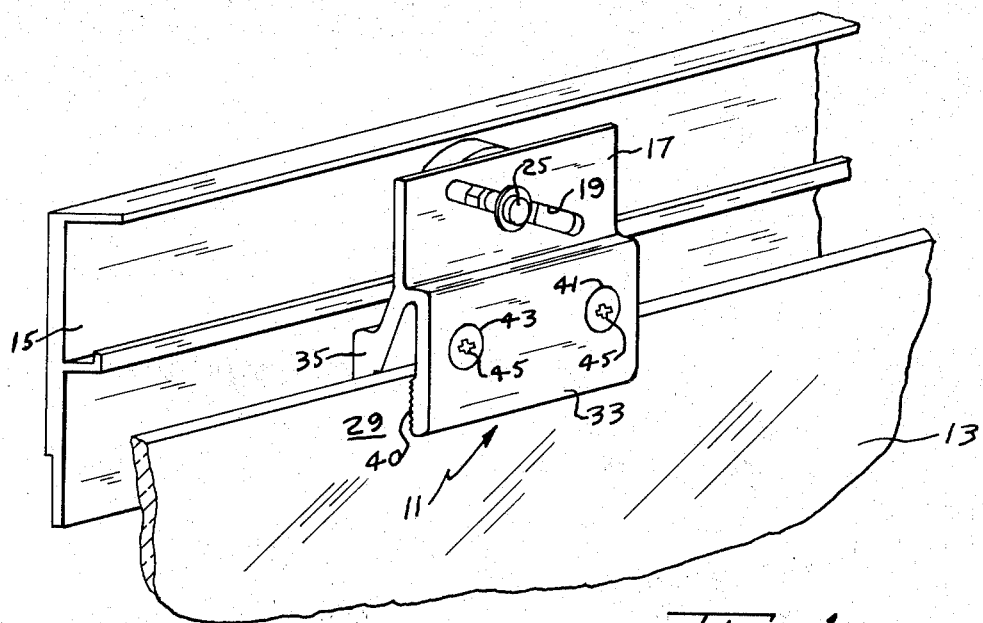
FIG. 1 is a perspective view of a roller bracket clamped in position to the upper edge of a glass panel including roller running in a track for movement of the panel.
Figure 2:
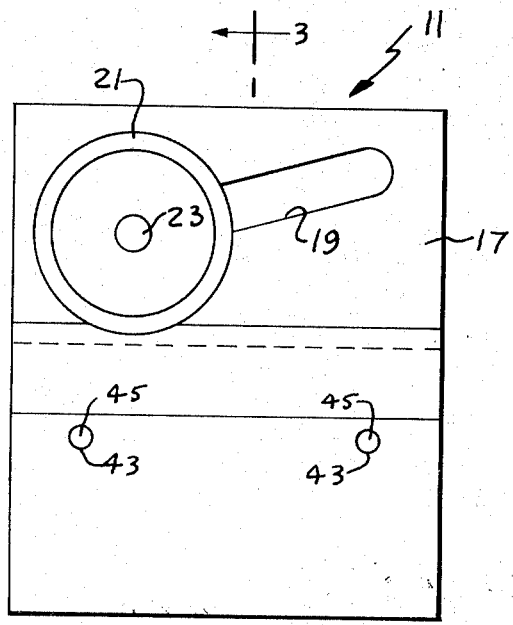
FIG. 2 is an enlarged front elevational view of the roller bracket of FIG. 1 showing the roller in position.

For purposes of illustration, a preferred embodiment 11 of the roller suspension bracket of the invention is shown in FIG. 1 as secured to a glass panel 12, and as supported by a channeled track member 13 comprising a portion of a shower enclosure frame in which, e.g., a glass panel door is to be provided. The bracket is formed as a unitary body 15 as by extrusion of a suitable material such as aluminum. Soft to medium hard aluminum or aluminum alloys are suitable. The body 13 of the roller bracket includes a roller mounting means, preferably formed as a flat plate tab portion 17 which includes an angularly disposed slot 19 extending therealong and having a roller 21 adjustably held therein. For example, the roller may include a threaded end shaft 23 extending through the slot and locked in position by means of a nut 25 pressing against a washer 27 and bearing on plate 17. In this manner, upon loosening the nut, the shaft of the roller may be adjustably moved along the length of the slot to properly position the panel for sliding movement along the track 13.

Figure 3:
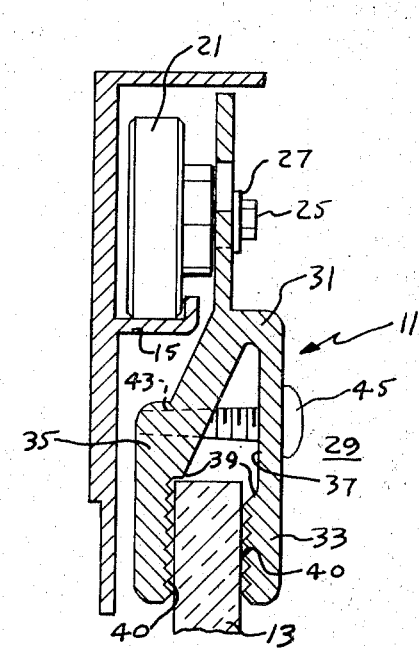
FIG. 3 is a cross sectional view taken along line 3—3 of FIG. 2.

The unitary body 15 of the bracket includes a panel mounting section 29 integrally formed with the mounting section, as by co-extrusion of the same. As may best be seen in FIG. 3 of the drawings, section 29 comprises transverse section 31 having two downwardly extending sidewall portions 33, 35 defining the panel receiving channel therebetween. The tab roller mounting plate portion may generally extend upwardly from transverse section 31. Sidewall portion 33 is structured downwardly from section 31 as a somewhat thinned section 36 terminating downwardly in a thickened jaw section 37 so that this sidewall is relatively deflectable. Sidewall portion 35 is formed as a relatively rigid massive section 39 which depends downwardly from section 31 but diverges away from sidewall 33 somewhat beneath roller 21. Massive section 39 thenceforth continues as a jaw section 41 in spaced parallel mating relation to jaw section 37. Accordingly, the channel formed between the side portions 33, 35 includes a top portion 42 formed substantially in the shape of a right triangle. The vertical side of the triangle is formed by the inner face of the substantially perpendicular section 36. The hypotenuse of the triangle is defined by the inner face of the section 39 which is substantially thicker in cross section than section 36 and is relatively rigid with respect thereto. Section 39 diverges downwardly from the transverse section 31 where it contacts the inner wall of jaw section 41 at any angle which permits clearance of track 15, for example, 60°, 45°, etc., and is complimentary with respect to the angle formed with section 31.

The triangular channel portion 37 extends downwardly approximately coextensively with sections 36 and 39. The jaw sections 37 and 41 continue downwardly therefrom in substantially parallel spaced planes defining a generally rectangular channel portion in which the upper edge portions of panel 12 are inserted during assembly.

For securing panel 12 therein at least one clearance hole 43 is provided in section 36 to receive a machine screw 45. Matching tapped holes are then provided in section 39 to enable screws 45 to be threadably inserted therein. In this manner, as the screws 45 are threaded into each respective hole, the heads will be brought into contact with the outside face of sidewall section 36. Further turning of the screws will then cause the sidewall section 36 to be pivoted or bent so that jaw sections 37 and 41 are brought to bear across panel 12 with a secure gripping force. Therefore, with a panel 12 inserted into the rectangular portion of the channel, the converging sidewalls will securely clamp the panel therebetween.

In order to attain a secure gripping action, the inner jaw surfaces are provided with serrations 46. When fabricated as by extrusion the serrations 46 may be provided as a series of parallel sharp pointed ridges. If fabricated otherwise, knurled or cross-hatched surfaces may be provided. It is generally highly desirable, if not essential, that the panel 12 be of tempered glass to withstand the gripping pressure as well as for the usual purposes for which such glass material is usually selected. It will be noted that such serrations formed in a material sufficiently soft to be extruded provide tip areas which can easily be deformed so as to relieve stress concentrations which might tend to shatter the glass panels.

Especially beneficial results are obtained when roughened glass surfaces, e.g., pebbled, scored, etc., are used. In this case the tip portions of the serrations deform to conform to the glass surface somewhat thereby creating interlocking jaw-panel interfaces with a more secure frictional gripping action. It will be appreciated that the relative thickness relationship of sections 36 and 39 may be interchanged if the deflection of section 39 can be tolerated.

It therefore can be seen that the roller bracket of the present invention may be utilized with a panel and may be quickly and easily secured or removed from the panel by the use of the adjustable screws.

In addition, the invention eliminates the need for adhesives or any other type of material normally required between the clamping surfaces to provide a sufficient clamping force. The clamp of the present invention may be adjusted for application to panels of different widths.

While the invention has been described in considerable detail, it is not to be limited to such details as have been set forth except as may be necessitated by the appended claims.

I claim:

1. A panel bracket for slidably suspending a glass panel comprising
    a generally rigid unitary body having an elongated panel receiving channel,
    said channel defined by a transverse upper section and extending sidewall portions,
    said sidewall portions including mating serrated jaw portions along the lower portion thereof for engaging a panel inserted therebetween, and
    clamping means carried by said body and extending through said channel for adjustably urging said serrated portions of said channel into contact with a panel inserted therebetween, whereby said bracket will be coupled to said panel, the sidewalls of said channel being of different thicknesses, and the upper portion of the channel including an open upper portion formed substantially as a right triangle, whereby, upon adjustment of said means, said sidewalls pivot toward each other to bring the serrated jaw portions of said channel sidewalls into contact with said panel.

2. The panel bracket of claim 1 wherein said channel includes an enlarged opening extending from the bottom thereof to substantially the top portion thereof and includes a right triangular shape top section with a bottom section having serrated jaw portions formed thereon facing toward each other to form gripping surfaces for the panel inserted therein, and said means for forcably urging said sides against the panel includes a pair of screws mounted in threaded holes extending through both sides and the triangular opening of said channel, whereby, the side portions of said channel may be pivoted toward each other by the tightening of said screws in said holes.

3. The panel bracket of claim 1 wherein the more massive one of said sidewalls of said channel includes an angularly diverging section depending from said transverse section and terminating in a jaw section in spaced parallel relation to the jaw section of the other sidewall section.

* * * * *